(12) United States Patent
Tsukada et al.

(10) Patent No.: US 10,923,748 B2
(45) Date of Patent: Feb. 16, 2021

(54) AIR CELL

(71) Applicant: Nissan Motor Co., Ltd., Yokohama (JP)

(72) Inventors: Yoshiko Tsukada, Kanagawa (JP); Mori Nagayama, Kanagawa (JP); Atsushi Miyazawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/592,150

(22) Filed: Oct. 3, 2019

(65) Prior Publication Data

US 2020/0036019 A1 Jan. 30, 2020

Related U.S. Application Data

(63) Continuation of application No. 14/390,325, filed as application No. PCT/JP2013/056753 on Mar. 12, 2013.

(30) Foreign Application Priority Data

Apr. 4, 2012 (JP) .................................. 2012-085301
Apr. 4, 2012 (JP) .................................. 2012-085303

(51) Int. Cl.
*H01M 8/04* (2016.01)
*H01M 8/04276* (2016.01)
(Continued)

(52) U.S. Cl.
CPC ....... *H01M 8/04283* (2013.01); *H01M 2/362* (2013.01); *H01M 6/32* (2013.01);
(Continued)

(58) Field of Classification Search
CPC .... H01M 8/04283; H01M 12/06; H01M 6/32; H01M 2/362; H01M 12/02; H01M 12/08;
(Continued)

(56) References Cited

U.S. PATENT DOCUMENTS 1,595,540 A 8/1926 Berrien
1,878,223 A 9/1932 Woodbridge
(Continued)

FOREIGN PATENT DOCUMENTS

JP S62177873 A 8/1987
JP 2004-100358 * 4/2004 ............... E03C 1/20
(Continued)

*Primary Examiner* — Michael L Dignan
(74) *Attorney, Agent, or Firm* — Young Basile Hanlon & MacFarlane, P.C.

(57) ABSTRACT

An air cell includes a plurality of electrode structures each including a filling chamber for an electrolyte liquid interposed between an air electrode and a metal negative electrode; an electrode housing portion individually housing the plural electrode structures; and a liquid supply unit which supplies the electrolyte liquid to the plural electrode structures. The electrode housing portion includes a plurality of liquid injection holes to inject the electrolyte liquid into the filling chambers of the respective electrode structures and a plurality of liquid junction prevention portions each dividing a space between the liquid injection holes adjacent to each other. The liquid supply unit includes a liquid injection device allowing the electrolyte liquid to flow into the plural liquid injection holes.

19 Claims, 15 Drawing Sheets

(51) Int. Cl.
*H01M 12/06* (2006.01)
*H01M 6/32* (2006.01)
*H01M 2/36* (2006.01)
*H01M 12/02* (2006.01)
*H01M 12/08* (2006.01)

(52) U.S. Cl.
CPC .......... *H01M 12/02* (2013.01); *H01M 12/06* (2013.01); *H01M 12/08* (2013.01); *H01M 12/065* (2013.01); *H01M 2220/10* (2013.01); *H01M 2220/20* (2013.01); *H01M 2250/20* (2013.01)

(58) Field of Classification Search
CPC .......... H01M 12/065; H01M 2220/10; H01M 2220/20; H01M 2250/20
See application file for complete search history.

(56) References Cited

U.S. PATENT DOCUMENTS

| | | | |
|---|---|---|---|
| 2,277,257 A | 3/1942 | Rieser | |
| 2,649,494 A | 8/1953 | Martin | |
| 2,732,985 A | 1/1956 | Howard | |
| 2,769,465 A | 11/1956 | Maybach | |
| 3,189,063 A * | 6/1965 | Lowe | H01M 2/361 |
| | | | 141/199 |
| 3,510,360 A | 5/1970 | Steiner | |
| 3,871,923 A | 3/1975 | Ikeda | |
| 4,626,482 A | 12/1986 | Hamlen et al. | |
| 5,453,334 A | 9/1995 | Melichar | |
| 6,427,732 B1 * | 8/2002 | Fitter | B67D 7/365 |
| | | | 141/31 |
| 6,554,025 B1 | 4/2003 | Fitter | |
| 6,635,387 B2 * | 10/2003 | Fitter | H01M 10/4235 |
| | | | 429/149 |
| 6,675,842 B1 | 1/2004 | Fitter | |
| 2004/0161661 A1 | 8/2004 | Campau | |
| 2006/0105230 A1 | 5/2006 | Fitter | |
| 2007/0240782 A1 | 10/2007 | Fitter | |
| 2008/0124599 A1 * | 5/2008 | Baik | H01M 2/1061 |
| | | | 429/406 |
| 2011/0200850 A1 | 8/2011 | Gottwick et al. | |
| 2011/0236730 A1 | 9/2011 | Jones | |
| 2012/0040253 A1 | 2/2012 | Hermann | |
| 2012/0285131 A1 * | 11/2012 | Osawa | H01M 8/04097 |
| | | | 55/300 |

FOREIGN PATENT DOCUMENTS

| | | | | |
|---|---|---|---|---|
| JP | 2008535156 A | | 8/2008 | |
| JP | 2009-079385 | * | 4/2009 | ............... E03C 1/20 |
| JP | 2010244731 A | | 10/2010 | |
| WO | 2006101280 A1 | | 9/2006 | |
| WO | WO2011-089821 | * | 7/2011 | ............. H01M 8/04 |
| WO | 2012172838 A1 | | 12/2012 | |

* cited by examiner

AIR CELL

CROSS REFERENCE TO RELATED APPLICATIONS

This application is a continuation of U.S. patent application Ser. No. 14/390,325, filed Oct. 2, 2014, which is a 371 application of PCT/JP2013/056753, filed Mar. 12, 2013, which claims the benefit of priority from Japanese Patent Application No. 2012-085301, filed on Apr. 4, 2012, and Japanese Patent Application No. 2012-085303, filed on Apr. 4, 2012, the entire contents of all of which are incorporated herein by reference.

TECHNICAL FIELD

The present invention relates to an air cell using oxygen as a positive electrode active material, and particularly, relates to an injection-type air cell into which an electrolyte liquid can be injected at the time of use.

BACKGROUND

There has been known an air cell, for example, as described in Japanese Unexamined Patent Application Publication No. S62-177873. The air cell described in Japanese Unexamined Patent Application Publication No. S62-177873 includes a frame including electrodes and a tank housing the frame and an electrolysis solution. The frame includes a pair of cathodes arranged at a predetermined interval and anodes each being placed to be opposed to the outer side of each cathode.

The air cell has a configuration in which the frame and the tank are provided with fin-shaped portions and grooves respectively. The fin-shaped portions engage with the grooves when the frame and the tank are assembled together so that two electrolyte holding regions electrically separated from each other are formed in the tank. Accordingly, generation of a current path (liquid junction) via the electrolysis solution between the anodes can be avoided. In addition, the air cell is provided with a non-conductive baffle between the paired cathodes. Therefore, a current flow can be prevented from being generated between the cathodes even if a liquid enters the space between the cathodes. The above-described air cell uses, for example, seawater as the electrolysis solution. The air cell is dropped into the sea so as to introduce seawater into the tank and thereby start power generation.

SUMMARY

In recent years, research and development of air cells used for power supplies or auxiliary power supplies in motor vehicles is being carried out. An air cell mounted in a vehicle is required to ensure output performance and capacity necessary for the vehicle and therefore required to have a configuration in which a plurality of electrode structures are arranged in series and use a strong alkaline electrolysis solution.

In the conventional air cell, since the fin-shaped portions and the grooves merely engage with each other at partitioning portions between the electrolyte holding regions, a liquid junction via the electrolysis solution cannot be completely prevented between the anodes. Thus, there is a problem of applying the conventional configuration to an air cell with high output power and high capacity using a strong alkaline electrolysis solution.

The air cell using seawater as the electrolysis solution has no practical problem with regard to a slight liquid junction, since the electrolysis solution has low resistance and the output power is small in such an air cell. On the other hand, any liquid junction should be prevented in an air cell using a strong alkaline electrolysis solution because the resistance of the electrolysis solution is high.

The present invention has been made in view of the above-described conventional problem. An object of the present invention is to provide an injection-type air cell including a plurality of electrode structures arranged in series, and particularly, an air cell capable of reliably preventing a liquid junction between the electrode structures via an electrolyte liquid.

An air cell according to an aspect of the present invention includes: a plurality of electrode structures each including a filling chamber for an electrolyte liquid interposed between an air electrode and a metal negative electrode; an electrode housing portion individually housing the plural electrode structures; and a liquid supply unit which supplies the electrolyte liquid to the plural electrode structures, wherein the plural electrode structures are arranged in series in the electrode housing portion, the electrode housing portion includes a plurality of liquid injection holes to inject the electrolyte liquid into the filling chambers of the respective electrode structures and a plurality of liquid junction prevention portions each dividing a space between the liquid injection holes adjacent to each other, and the liquid supply unit includes a storage tank for the electrolyte liquid and a liquid injection device allowing the electrolyte liquid in the storage tank to flow into the plural liquid injection holes.

DESCRIPTION OF EMBODIMENTS

First Embodiment

Figure 1A:
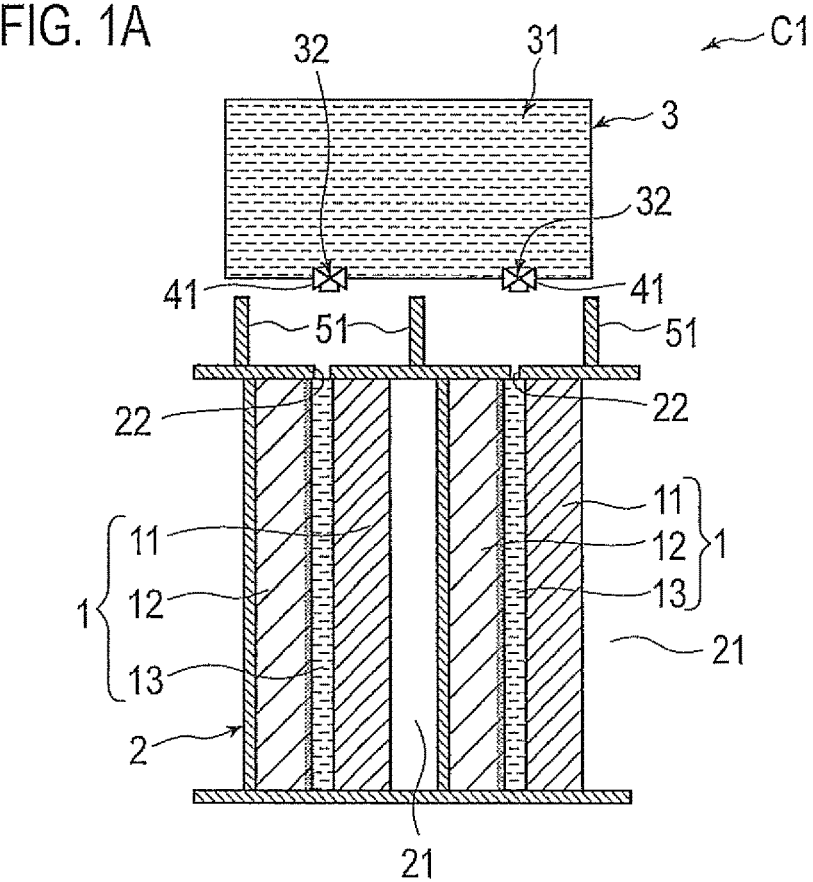
FIG. 1A is a cross-sectional view of an air cell according to a first embodiment of the present invention.

An air cell C1 shown in FIG. 1A includes a plurality of electrode structures 1, an electrode housing portion 2 having a plurality of housing compartments individually housing the plural electrode structures 1, and a liquid supply unit 3 for supplying an electrolyte liquid to the plural electrode structures 1, each electrode structure 1 including an air electrode 11, a metal negative electrode 12 and a filling chamber 13 for the electrolyte liquid interposed between the respective electrodes. Here, each of the electrode structures 1 serves as a single cell (an air cell) once the electrolyte liquid is supplied thereto. Thus, the air cell C1 according to the present embodiment is an assembly of single cells and is also referred to as an assembled battery.

Each of the electrode structures 1 is formed into a rectangular plate as a whole. The air electrode 11 includes a positive electrode member and a water-repellent layer placed as an outermost layer of the air electrode 11 (not shown in the figure). The positive electrode member contains, for example, a catalyst component and an electric conductive catalyst carrier on which the catalyst component is supported.

In particular, the catalyst component is metal selected as appropriate from platinum (Pt), ruthenium (Ru), iridium (Ir), silver (Ag), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga), and aluminum (Al), or an alloy of these metals arbitrarily combined together. The shape and size of the catalyst component are not particularly limited, and any shape and size similar to those used in conventionally-known catalyst components may be used. However, the catalyst component is preferably in a particle state. The average particle diameter of catalyst particles is preferably in a range from 1 nm to 30 nm. When the average particle diameter of the catalyst particles is within the range from 1 nm to 30 nm, a balance of ease of support of the catalyst component and a catalyst utilization rate with regard to an effective electrode area in which an electrochemical reaction progresses, can be controlled as appropriate.

The catalyst carrier functions as a carrier for supporting the catalyst component as described above and as an electron conducting path involved in electron communication between the catalyst component and other substances. The catalyst carrier is not particularly limited as long as it has a specific surface area sufficient to support the catalyst component in a desired dispersed state and has sufficient electron conductivity, and preferably contains carbon as a main component. A specific example of the catalyst carrier may be carbon particles containing carbon black, activated carbon, coke, natural graphite or artificial graphite. The size of the catalyst carrier is not particularly limited; however, an average particle diameter of the catalyst carrier may be approximately in a range from 5 nm to 200 nm, preferably approximately in a range from 10 nm to 100 nm, in view of ease of support, the catalyst utilization rate, the thickness of the catalyst layer adjusted within an appropriate range, and the like.

The supported amount of the catalyst component in the positive electrode member is preferably in a range from 10% to 80% by mass, more preferably in a range from 30% to 70% by mass, with respect to the total amount of the positive electrode member. However, the positive electrode member is not limited thereto, and conventionally-known materials applied to air cells may be used.

The water-repellent layer has a liquid-tight (watertight) property with respect to the electrolyte liquid and has air permeability with respect to oxygen. The water-repellent layer includes a water-repellent film such as polyolefin or fluorine resin in order to prevent leakage of the electrolyte liquid, and also has a large number of fine pores in order to supply oxygen to the positive electrode member.

The metal negative electrode 12 includes a negative electrode active material containing a single substance of metal or an alloy having a standard electrode potential which is less noble than that of hydrogen. Examples of a single substance of metal having a standard electrode potential less noble than that of hydrogen, include zinc (Zn), iron (Fe), aluminum (Al), magnesium (Mg), manganese (Mn), silicon (Si), titanium (Ti), chromium (Cr), and vanadium (V). The alloy may be obtained in such a manner as to add, to the metal element as listed above, one or more kinds of metal elements or non-metal elements. However, the material is not limited thereto, and conventionally-known materials applied to air cells may be used.

The electrode housing portion 2 has a configuration in which the plural electrode structures 1 are each formed into a rectangular plate and kept in a standing state, and are arranged in series in the horizontal direction and individually housed in each of the plural housing compartments. Each of the housing compartments of the electrode housing portion 2 is provided with an air chamber 21 located towards the air electrode 11 of each electrode structure 1. The electrode housing portion 2 further includes a plurality of liquid injection holes 22 formed at the upper portion of the electrode housing portion 2 through which the electrolyte liquid is injected into the plural filling chambers 13 of the electrode structures 1, and a plurality of liquid junction prevention portions 51 having a protruding structure so that a space between the liquid injection holes 22 adjacent to each other is divided by each liquid junction prevention portion 51.

The plural liquid junction prevention portions 51 of the present embodiment are each formed into a rib as shown in FIG. 1. The electrode housing portion 2 is further provided with liquid junction prevention portions 51 located towards the end portions in the arrangement direction with respect to the liquid injection holes 22 for injecting the electrolyte liquid into the filling chambers 13 of the electrode structures 1 located at the end portions in the arrangement direction. In other words, the liquid junction prevention portions 51 are also located on both sides of each liquid injection hole 22.

Figure 1B:
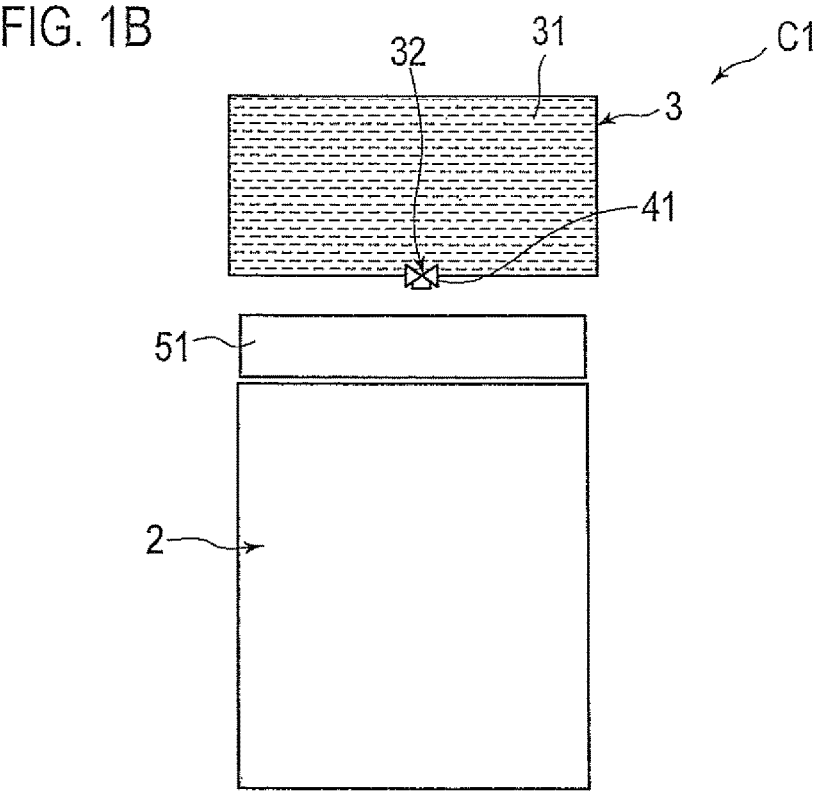
FIG. 1B is a side view of the air cell according to the first embodiment of the present invention.

As shown in FIG. 1A and FIG. 1B, the liquid supply unit 3 includes a storage tank 31 for the electrolyte liquid, and a plurality of liquid injection devices 32 located above the respective liquid injection holes 22 to allow the electrolyte liquid in the storage tank 31 to flow into the liquid injection holes 22. In the present embodiment, each liquid injection device 32 includes a switching body 41 which controls the flow of the electrolyte liquid. The plural liquid injection devices 32 are located to face the corresponding liquid injection holes 22. The switching body 41 is a switching valve. The plural liquid injection devices 32 are each located at a position vertically separate from the liquid junction prevention portions 51.

The electrolyte liquid stored in the liquid supply unit 3 is an electrolysis solution or, for example, a liquid (water) for dissolving a solid electrolyte placed or mixed in the electrode structures 1 or in a pipe 35 (shown in FIG. 2) installed from the storage tank 31 to the respective liquid injection devices 32. In the case of using the electrolysis solution, an aqueous solution of potassium chloride, sodium chloride, or potassium hydroxide may be applicable. However, the electrolyte liquid is not limited thereto, and conventionally-known electrolysis solutions applied to air cells may be used. The amount of the electrolyte liquid is determined in view of a discharge time of the air cell C1, a precipitation amount of metal salt produced at the time of discharge, or the like.

Figure 2:
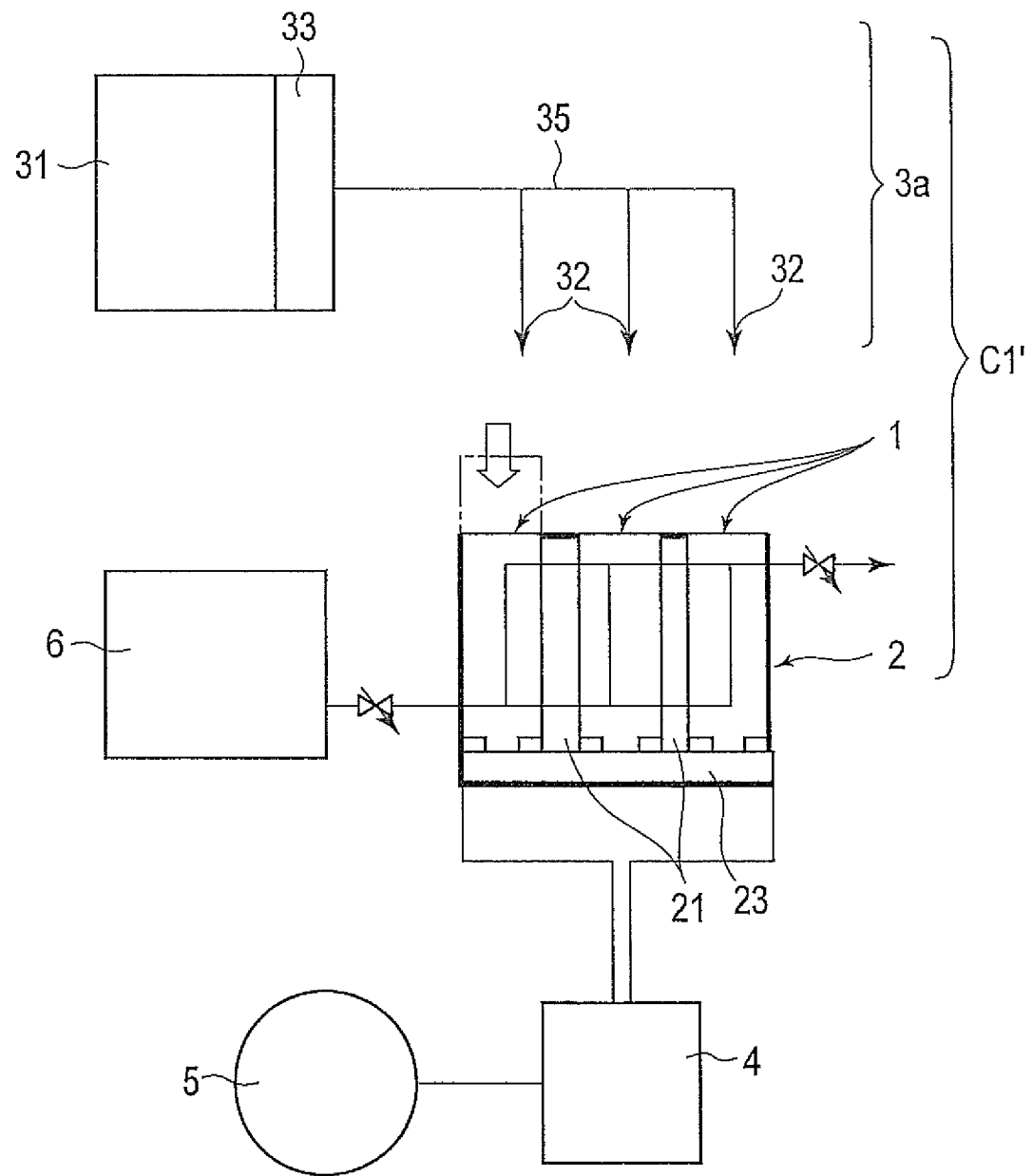
FIG. 2 is a block diagram schematically showing an air cell system including an air cell in which a liquid supply unit shown in FIG. 1A is further equipped with a controller and a pipe.

FIG. 2 is a block diagram schematically showing an air cell system including an air cell C1' in which the liquid supply unit 3 shown in FIG. 1 is further equipped with a controller 33 and the pipe 35. Each of the electrode structures 1 includes a case housing the air electrode 11 and the metal negative electrode 12 so as to serve as a cartridge, and is housed in each of the housing compartments of the electrode housing portion 2 as indicated by the arrow in the figure. The electrode housing portion 2 is provided with a cover (not shown in the figure) placed on the respective housing compartments. The cover may also be provided with the liquid injection holes 22 and the liquid junction prevention portions 51.

The electrode housing portion 2 further includes a busbar 23 inside thereof on which the plural electrode structures 1 housed in the electrode housing portion 2 are connected in series. The air cell C1' supplies electric power to a driven body 5 such as a motor via a controller 4.

The electrode housing portion 2 is further connected with an air supply unit 6. The air supply unit 6 supplies air to the air chambers 21 adjacent to the electrode structures 1 in the respective housing compartments. The air supply unit 6 includes an air compressor, a flow amount control valve, pipes, and the like.

The liquid supply unit 3 includes the storage tank 31, the liquid injection devices 32, the pipe 35 and the controller 33 that controls the flow of the electrolyte liquid. The controller 33 includes a pump, a flow amount control valve, and the like. Instead of the configuration of the air cell C1 shown in FIG. 1 in which the storage tank 31 and the liquid injection devices 32 are directly connected together, the air cell C1' may have a configuration in which the storage tank 31 and the liquid injection devices 32 are provided separately from each other, as shown in FIG. 2.

In the air cell C1 configured as described above, the liquid supply unit 3 opens the switching bodies (the switching valves) 41 of the respective liquid injection devices 32 so that the electrolyte liquid flows down through the liquid injection holes 22 to be injected into the filling chambers 13 of the respective electrode structures 1. Accordingly, each of the electrode structures 1 serves as a single cell (an air cell) to start power generation.

Here, a slight amount of the electrolyte liquid may remain on the upper surface of the electrode housing portion 2 after the injection of the electrolyte liquid. In order to deal with such a problem, the air cell C1 includes the plural liquid junction prevention portions 51 each having a protruding structure and dividing the space between the liquid injection holes 22 adjacent to each other. Thus, the remaining electrolyte liquid does not flow into the adjacent liquid injection hole 22. Accordingly, the air cell C1 can reliably prevent a liquid junction between the electrode structures (the single cells) 1 adjacent to each other, namely, a short circuit via the electrolyte liquid. Therefore, the air cell C1 can be applied appropriately to an air cell with high output power and high capacity using an electrolysis solution having high resistance, such as a strong alkaline electrolysis solution, in which any liquid junction should be prevented. The air cell C1 is thus remarkably suitable for an onboard power supply for a vehicle or the like which is required to have high output power and high capacity.

In addition, the air cell C1 has a configuration in which the electrode housing portion 2 is provided with the liquid junction prevention portions 51 also at the end portions in the arrangement direction of the electrode structures 1. This configuration can prevent the electrolyte liquid from flowing out of the air cell C1 at the time of injecting the electrolyte liquid.

Further, the air cell C1 uses the storage tank 31 as a common tank for the plural electrode structures 1 so as to simplify the structure thereof and reduce costs. In addition, since the liquid injection devices 32 each include the switching body (the switching valve) 41, the amount of the electrolyte liquid used can be adjusted. Since the switching bodies 41 are closed after the electrolyte liquid is injected, a liquid junction via the electrolyte liquid in the storage tank 31 can be prevented.

Further, the air cell C1 is provided with the plural liquid injection devices 32 in such a manner as to face the corresponding liquid injection holes 22. Therefore, the electrolyte liquid can be injected rapidly into the respective electrode structures 1, which can contribute to shortening the startup time. Further, since the air cell C1 can inject the electrolyte liquid only into the selected electrode structures 1, the air cell C1 can selectively start a particular number of the electrode structures (the single cells) 1 depending on the required amount of electricity. The air cell C1 can also easily deal with automatic control of liquid injection.

Further, since the air cell C1 includes the plural liquid injection devices 32 each being located at a position vertically separate from the liquid junction prevention portions 51, a liquid junction between the electrode structures (the single cells) 1 via the electrolyte liquid on the liquid supply unit 3 side can be prevented at the time of and after injecting the electrolyte liquid.

FIG. 3A to FIG. 11C are views for explaining air cells C2 to C9 according to the first to eighth modified examples of the first embodiment of the present invention. It should be noted that the same elements as those of the air cell C1 are indicated by the same reference numerals in the respective modified examples, and specific explanations thereof are omitted as appropriate.

Figure 3A:
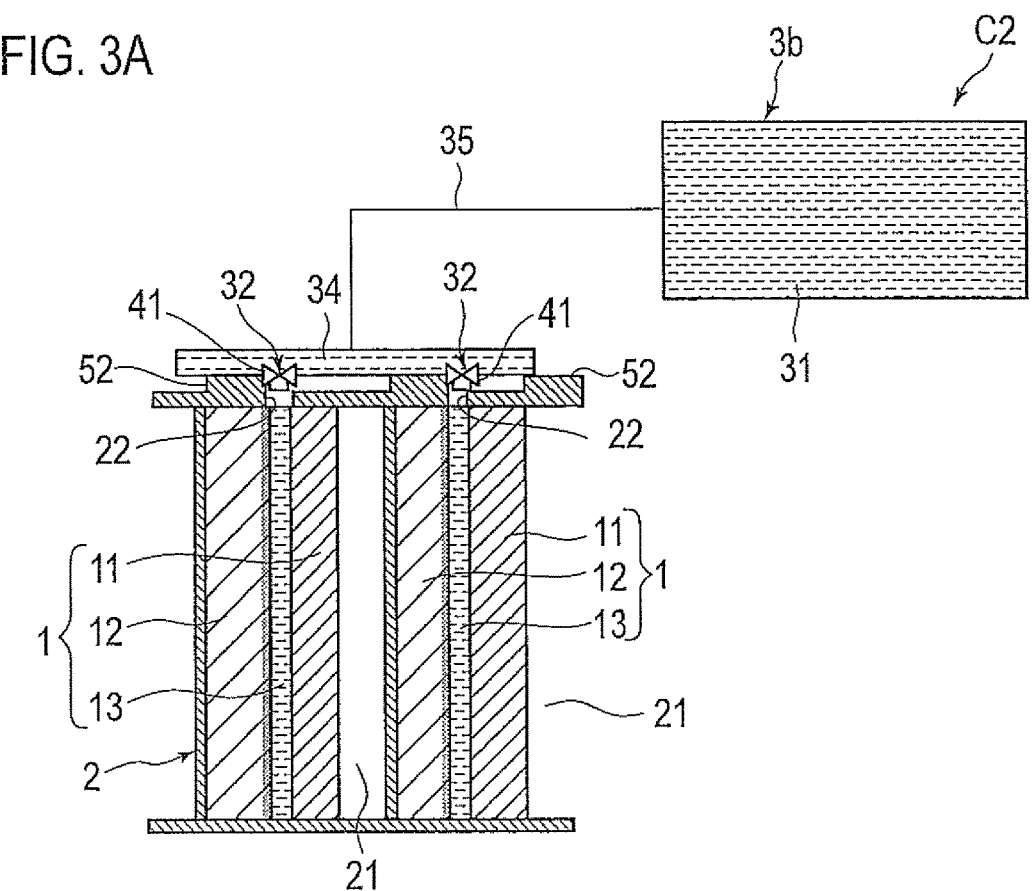
FIG. 3A is a cross-sectional view of an air cell according to a first modified example of the first embodiment of the present invention.
Figure 3B:
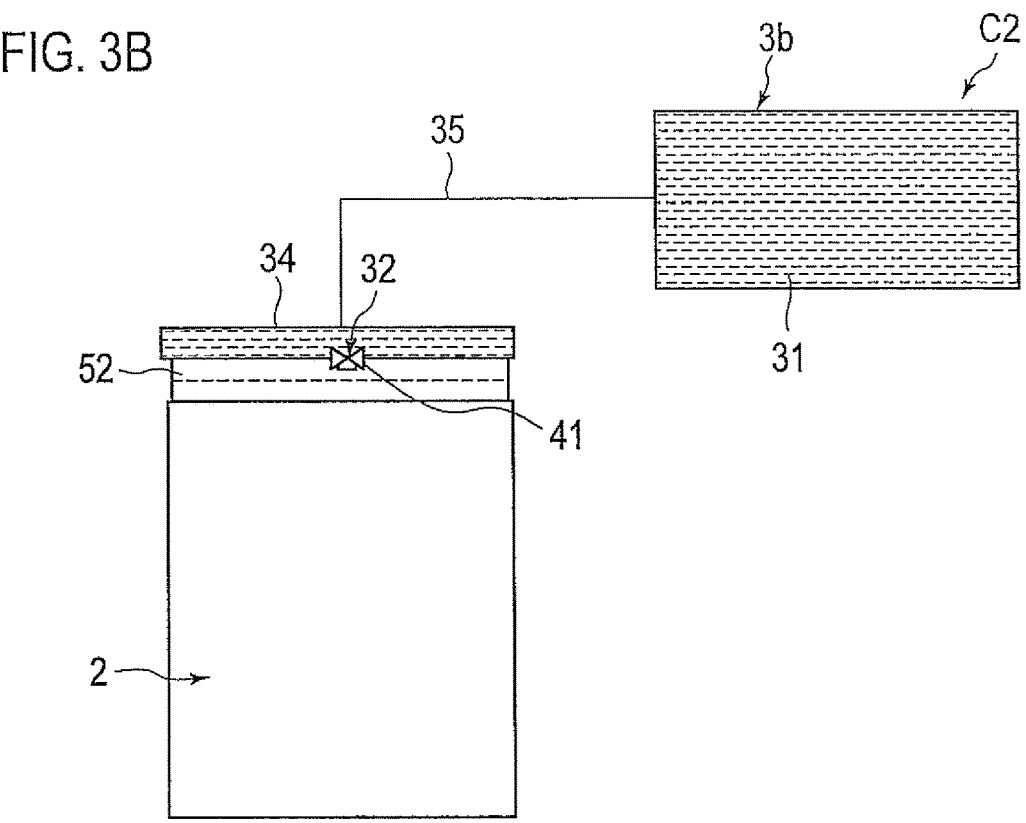
FIG. 3B is a side view of the air cell according to the first modified example of the first embodiment of the present invention.

An air cell C2 according to the first modified example shown in FIG. 3A and FIG. 3B includes, on the upper surface of the electrode housing portion 2, the liquid injection holes 22 corresponding to the respective electrode structures 1, and liquid junction prevention portions 52 each having a protruding structure formed into a step and being located on one side of each liquid injection hole 22. The liquid supply unit 3 includes the storage tank 31 and a supply head 34 provided with the plural liquid injection devices 32. The supply head 34 is connected to the storage tank 31 via the pipe 35 and can be lifted up and down with respect to the electrode housing portion 2.

Figure 4A:
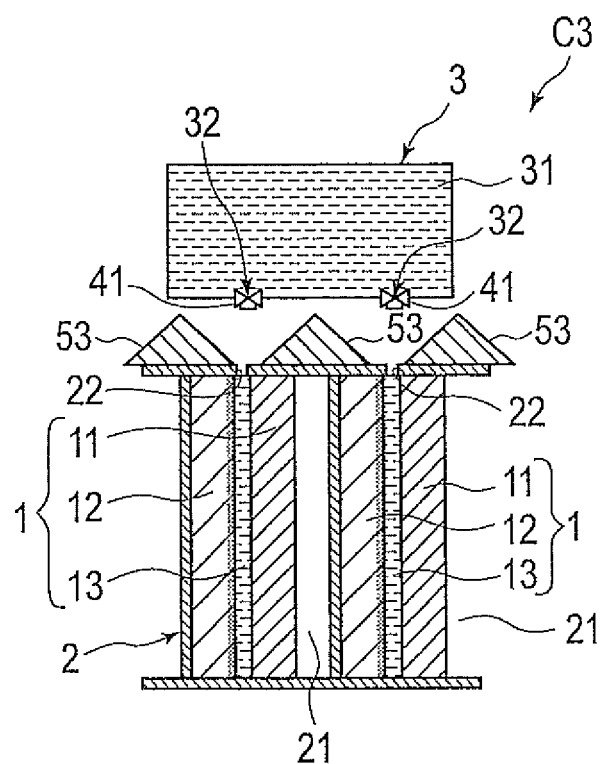
FIG. 4A is a cross-sectional view of an air cell according to a second modified example of the first embodiment of the present invention.
Figure 4B:
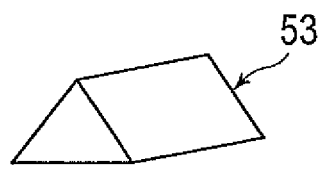
FIG. 4B is a perspective view of a liquid junction prevention portion according to the second modified example of the first embodiment of the present invention.

In the air cell C2 configured as described above, the electrolyte liquid is injected into the respective electrode structures 1 by the liquid supply unit 3. The electrolyte liquid may be injected while the supply head 34 is in contact with the liquid junction prevention portions 52. The air cell C2 can reliably prevent a liquid junction between the electrode structures (the single cells) 1 via the electrolyte liquid in the same manner as the air cell C1. An air cell C3 according to the second modified example shown in FIG. 4A includes a plurality of liquid junction prevention portions 53 each having surfaces inclined downward to the liquid injection holes 22 or having a step. In particular, as shown in FIG. 4B, each of the liquid junction prevention portions 53 has a triangular cross-section and has surfaces inclined downward to the liquid injection holes 22.

The air cell C3 can ensure smooth and rapid injection of the electrolyte liquid into the liquid injection holes 22 and shorten the startup time in a manner such that the inclined surfaces of the liquid junction prevention portions 53 serve as a guide at the time of injecting the electrolyte liquid, so as to achieve the same functions and effects as the air cell C1. The inclined surfaces of the liquid junction prevention portions 53 contribute to avoiding the remains of the electrolyte liquid and thereby reliably preventing a liquid junction.

Figure 5A:
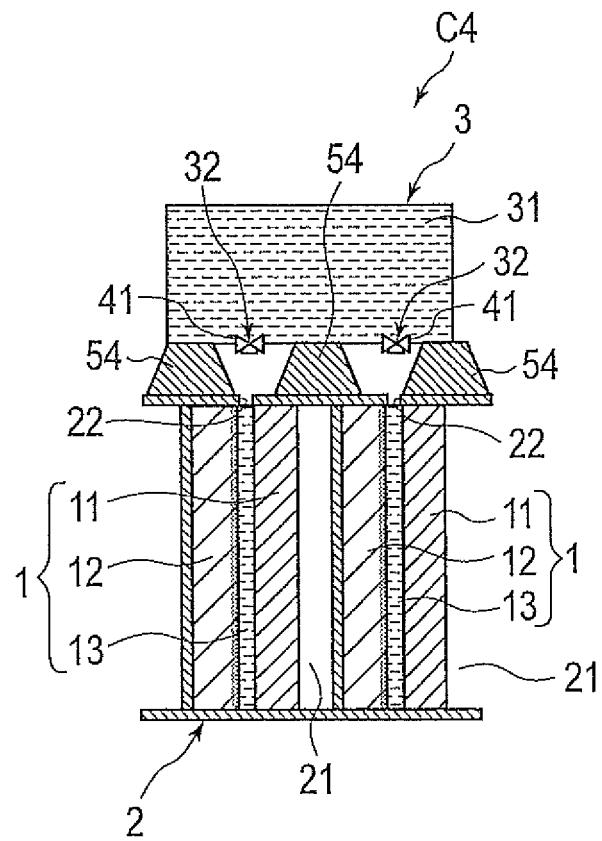
FIG. 5A is a cross-sectional view of an air cell according to a third modified example of the first embodiment of the present invention.
Figure 5B:
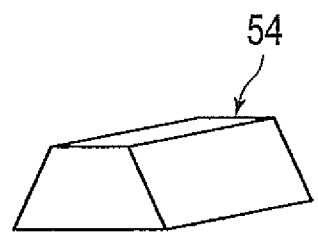
FIG. 5B is a perspective view of a liquid junction prevention portion according to the third modified example of the first embodiment of the present invention.

An air cell C4 according to the third modified example shown in FIG. 5A includes a plurality of liquid junction prevention portions 54 each having surfaces inclined downward to the liquid injection holes 22 or having a step. In particular, as shown in FIG. 5B, each of the liquid junction prevention portions 54 has a trapezoidal cross-section and has surfaces inclined downward to the liquid injection holes 22.

The air cell C4 can ensure smooth and rapid injection of the electrolyte liquid into the liquid injection holes 22 and shorten the startup time in a manner such that the inclined surfaces of the liquid junction prevention portions 53 serve as a guide at the time of injecting the electrolyte liquid, so as to achieve the same functions and effects as the air cell C1. In addition, since the upper surfaces of the respective liquid junction prevention portions 54 are flat, the liquid supply unit 3 comes into contact with the liquid junction prevention portions 54 when the electrolyte liquid is injected so that the liquid supply unit 3 can be positioned appropriately.

Figure 6A:
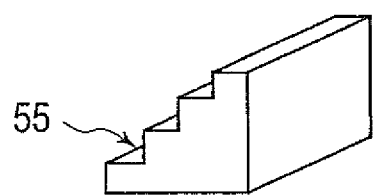
FIG. 6A is a perspective view for explaining another form of the liquid junction prevention portion according to the third modified example of the first embodiment of the present invention.
Figure 6B:
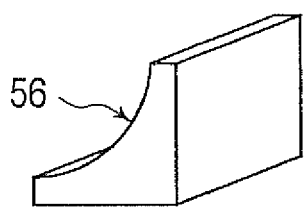
FIG. 6B is a perspective view for explaining yet another form of the liquid junction prevention portion according to the third modified example of the first embodiment of the present invention.
Figure 6C:
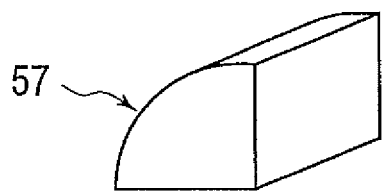
FIG. 6C is a perspective view for explaining yet another form of the liquid junction prevention portion according to the third modified example of the first embodiment of the present invention.

FIGS. 6A, 6B and 6C show liquid junction prevention portions 55, 56 and 57, respectively, each having surfaces inclined downward to the liquid injection holes 22 or having steps. The liquid junction prevention portion 55 shown in FIG. 6A has a cross-sectional shape having downward steps towards the liquid injection hole 22. The liquid junction prevention portion 56 shown in FIG. 6B has a cross-sectional shape having a concave curved surface inclined downward to the liquid injection hole 22. The liquid junction prevention portion 57 shown in FIG. 6C has a cross-sectional shape having a convex curved surface inclined downward to the liquid injection hole 22. The respective liquid junction prevention portions 55, 56 and 57 can achieve the same effects as the liquid junction prevention portion 51 of the air cell C1.

Figure 7A:
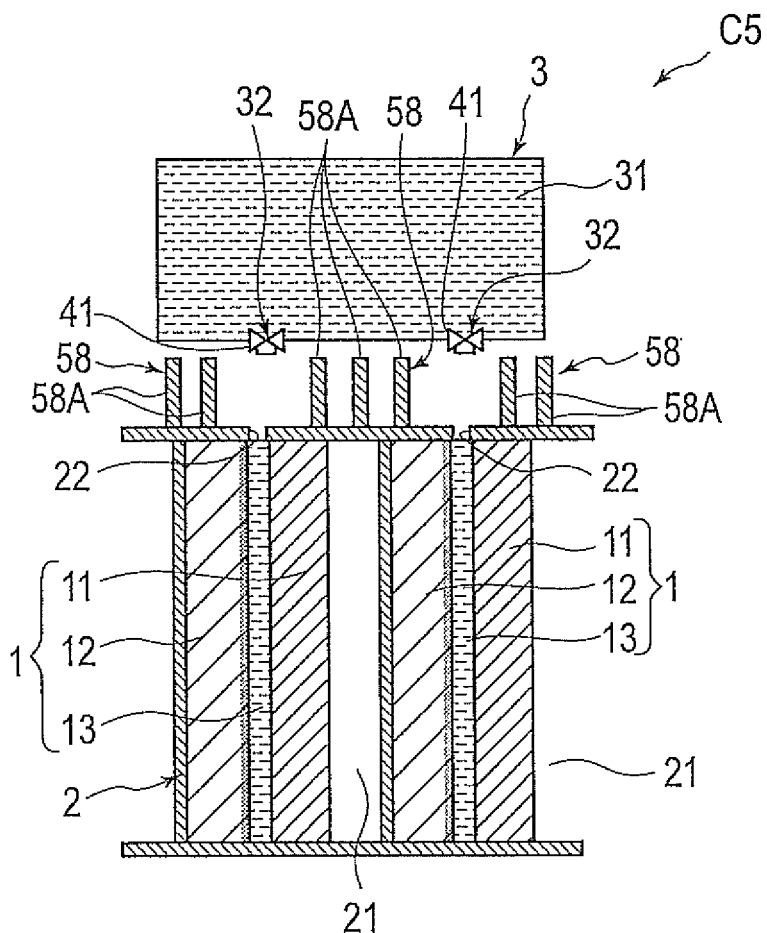
FIG. 7A is a cross-sectional view of an air cell according to a fourth modified example of the first embodiment of the present invention.

An air cell C5 according to the fourth modified example shown in FIG. 7A includes a plurality of liquid junction prevention portions 58 each including a plurality of projections 58A located at predetermined intervals in the arrangement direction of the electrode structures 1. In particular, the respective liquid junction prevention portions 58 include the plural projections 58A having the same height.

The air cell C5 can achieve the same functions and effects as the air cell C1. In particular, the air cell C5 can secure the state of preventing a liquid junction immediately after the electrolyte liquid is injected, so as to achieve an improved liquid junction preventing function. Alternately, the liquid junction prevention portions 58 each include the plural projections 58A having different heights.

Figure 7B:
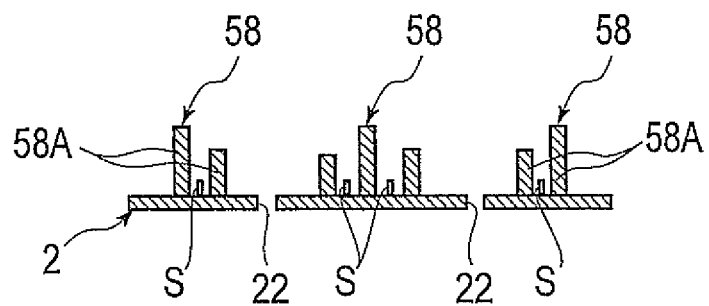
FIG. 7B is a cross-sectional view for explaining another form of a liquid junction prevention portion according to the fourth modified example of the first embodiment of the present invention.

The air cell C5 may further include sensors S between the respective projections 58A, as shown in FIG. 7B. According to this configuration, even when the electrolyte liquid flowing from the liquid injection devices 32 flows over the projections 58A closest to the liquid injection holes 22, the sensors S can detect the flowing electrolyte liquid so as to close the switching body 41.

Figure 8A:
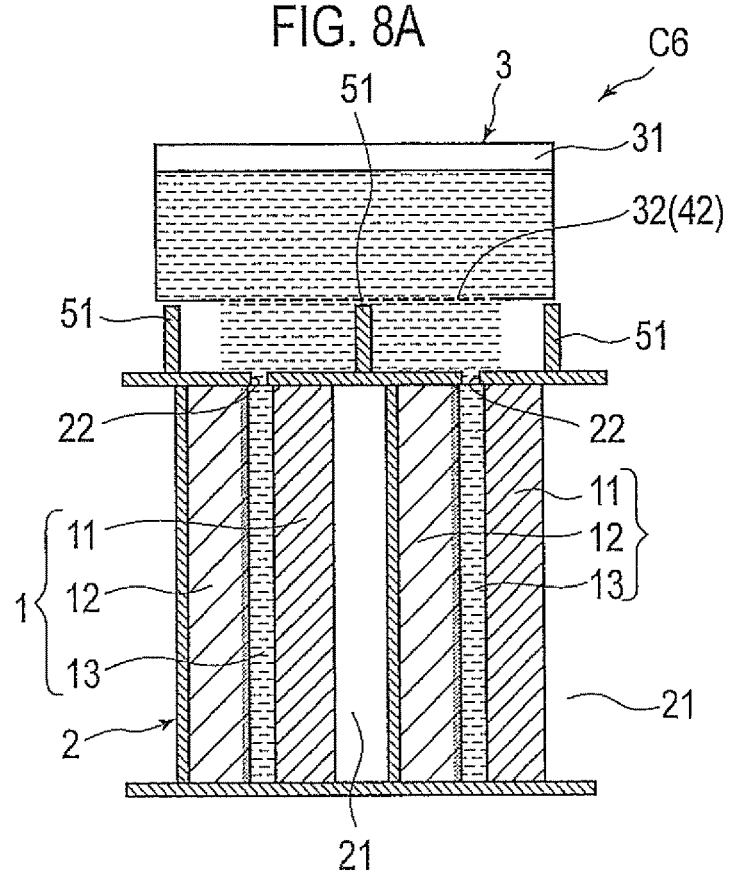
FIG. 8A is a cross-sectional view of an air cell according to a fifth modified example of the first embodiment of the present invention while showing a state during injection of an electrolyte liquid.
Figure 8B:
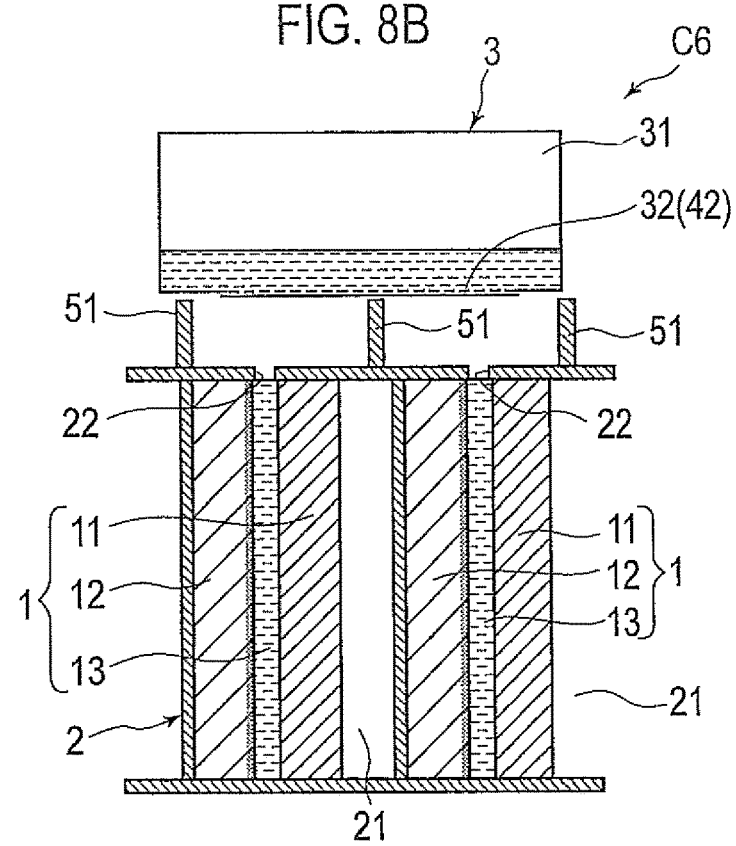
FIG. 8B is a cross-sectional view of the air cell according to the fifth modified example of the first embodiment of the present invention while showing a state after injection of the electrolyte liquid.

In an air cell C6 according to the fifth modified example shown in FIG. 8A and FIG. 8B, the liquid injection device 32 of the liquid supply unit 3 includes a switching body 42 instead of the switching body 41 (the switching valve) of the air cell C1. The switching body 42 is placed to allow the electrolyte liquid to flow into the plural liquid injection holes 22. The switching body 42 of this modified example is a partitioning plate. The air cell C6 opens the switching body 42 so as to allow the electrolyte liquid to immediately flow onto the upper surface of the electrode housing portion 2 and thereby inject the electrolyte liquid into the plural electrode structures 1. Here, the electrolyte liquid may fall on and cover the middle liquid junction prevention portion 51.

The air cell C6 can greatly shorten the time interval between the injection of the electrolyte liquid and the startup. The liquid junction prevention portions 51 can reliably prevent a liquid junction between the electrode structures (the single cells) 1 via the electrolyte liquid after the injection of the electrolyte liquid.

Figure 9A:
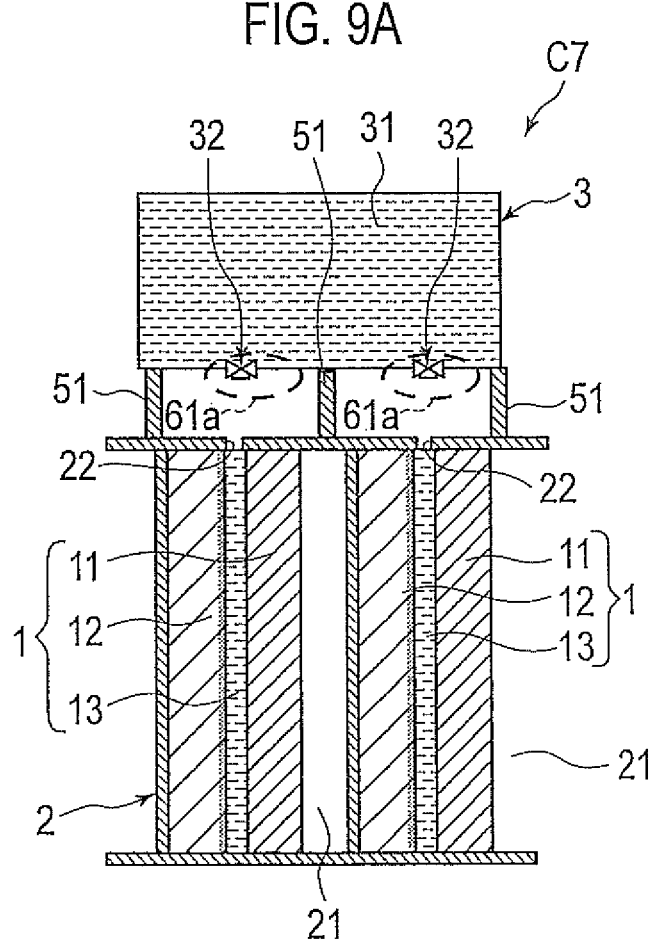
FIG. 9A is a cross-sectional view of an air cell according to a sixth modified example of the first embodiment of the present invention.
Figure 9B:
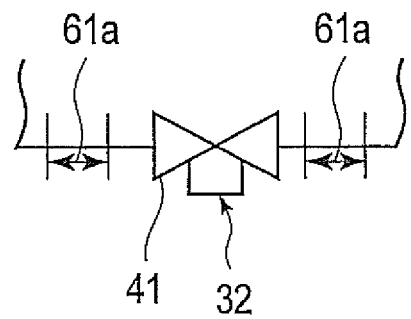
FIG. 9B is a partly enlarged view of a liquid injection device according to the sixth modified example of the first embodiment of the present invention.

An air cell C7 according to the sixth modified example shown in FIG. 9A and FIG. 9B includes water-repellent portions 61a having water repellency provided at least on peripheral surfaces of the respective liquid injection devices 32. The water-repellent portions 61a are formed, for example, in a manner such that an arbitrary water-repellent agent is applied to the peripheral surfaces of the respective liquid injection devices 32. The contact angle of each water-repellent portion 61a with respect to the electrolyte liquid (namely, water or an electrolysis solution) is at least 50 degrees or greater, preferably 80 degrees or greater.

The air cell C7 can achieve the same functions and effects as the air cell C1 and also prevent the electrolyte liquid from adhering to the peripheries of the respective liquid injection devices 32 due to the water-repellent portions 61a. Accordingly, even in a state where the storage tank 31 is in contact with the liquid junction prevention portions 51 as shown in FIG. 9A, a liquid junction between the electrode structures (the single cells) 1 via the electrolyte liquid on the storage tank 31 side can be prevented.

Figure 10A:
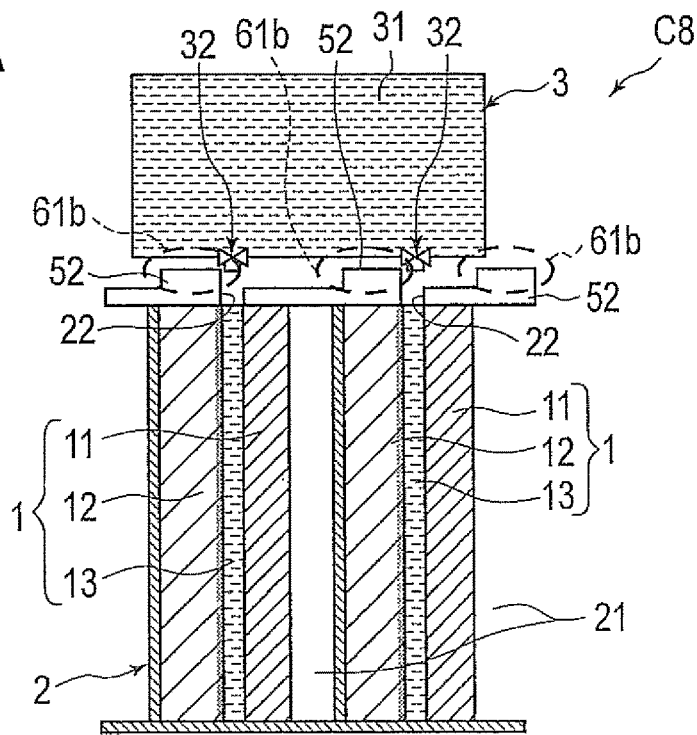
FIG. 10A is a cross-sectional view of an air cell according to a seventh modified example of the first embodiment of the present invention.
Figure 10B:
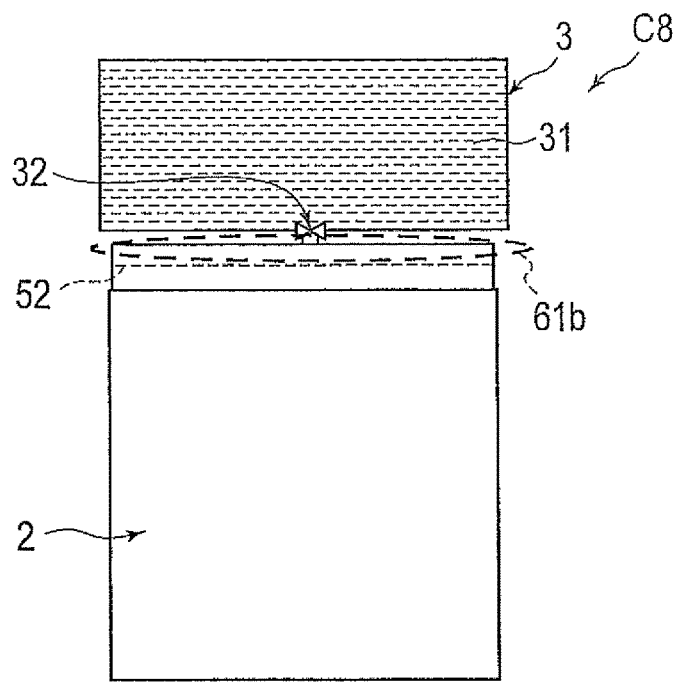
FIG. 10B is a side view of the air cell according to the seventh modified example of the first embodiment of the present invention.
Figure 10C:
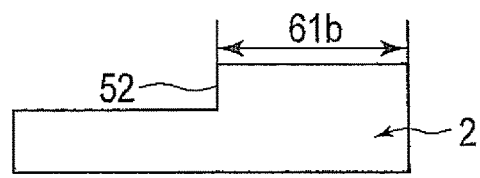
FIG. 10C is a partly enlarged view of a liquid junction prevention portion according to the seventh modified example of the first embodiment of the present invention.

An air cell C8 according to the seventh modified example shown in FIGS. 10A, 10B and 10C includes water-repellent portions 61b having water repellency provided at least on surfaces of top portions of the respective liquid junction prevention portions 52. The air cell C8 can achieve the same functions and effects as the air cell C1 and also prevent the electrolyte liquid from remaining on the top portions of the respective liquid junction prevention portions 52 due to the water-repellent portions 6 1b. Accordingly, the air cell C8 can further improve the liquid junction preventing function due to the liquid junction prevention portions 52.

Figure 11A:
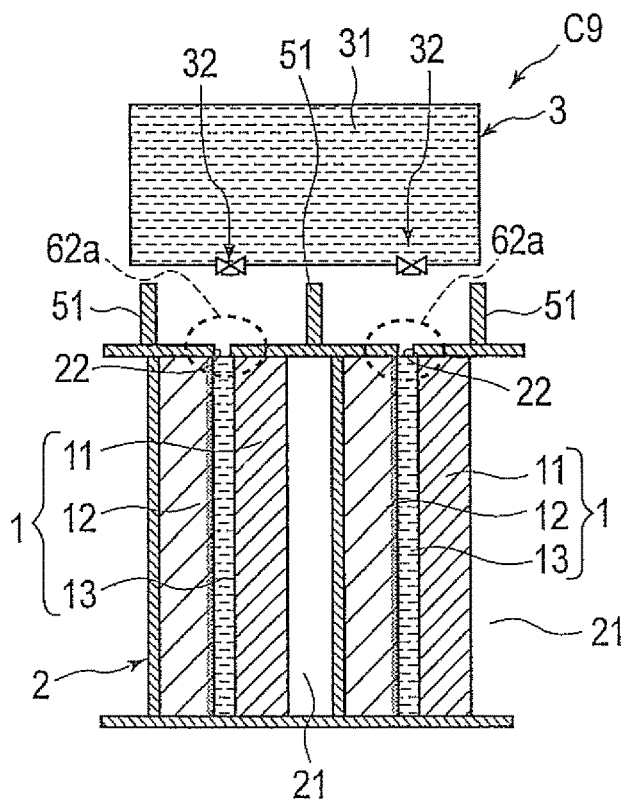
FIG. 11A is a cross-sectional view of an air cell according to an eighth modified example of the first embodiment of the present invention.
Figure 11B:
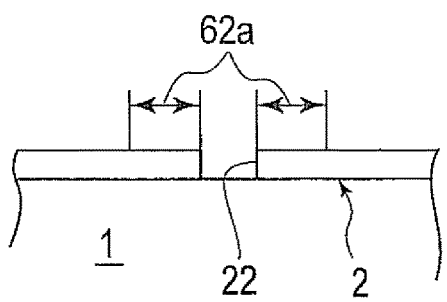
FIG. 11B is a partly enlarged view of a liquid injection hole according to the eighth modified example of the first embodiment of the present invention.
Figure 11C:
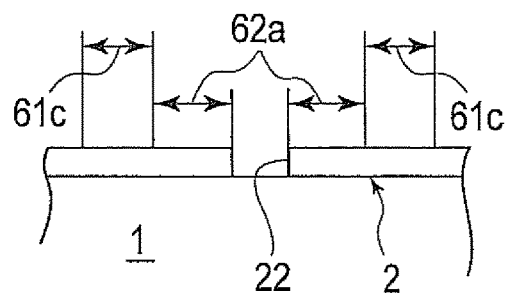
FIG. 11C is a partly enlarged view of the liquid injection hole according to the eighth modified example of the first embodiment of the present invention.

An air cell C9 according to the eighth modified example shown in FIG. 11A and FIG. 11B includes hydrophilic portions 62a having hydrophilicity provided on peripheries of the openings of the respective liquid injection holes 22. The hydrophilic portions 62a are formed, for example, in a manner such that an arbitrary hydrophilic agent is applied to the peripheries of the openings of the respective liquid injection holes 22. The contact angle of each hydrophilic portion 62a with respect to the electrolyte liquid (namely, water or an electrolysis solution) is at least less than 80 degrees, preferably less than 50 degrees.

The air cell C9 can achieve the same functions and effects as the air cell C1 and also allow the electrolyte liquid to easily flow into the respective liquid injection holes 22 due to the hydrophilic portions 62a so as to further shorten the startup time in association with an increase of the liquid injection rate.

In addition to the hydrophilic portions 62a serving as hydrophilic regions provided on the peripheries of the openings of the respective liquid injection holes 22, the air cell C9 may further include water-repellent portions 61c serving as water-repellent regions on the outer sides of the hydrophilic regions (namely, the hydrophilic portions 62a).

The air cell C9 can not only increase the liquid injection rate and further shorten the startup time due to the hydrophilic portions 62a but also prevent the electrolyte liquid from remaining on the peripheries of the respective liquid injection holes 22 due to the water-repellent portions 61c after the injection of the electrolyte liquid. Accordingly, a liquid junction between the electrode structures (the single cells) 1 via the electrolyte liquid can be prevented.

Second Embodiment

Figure 12A:
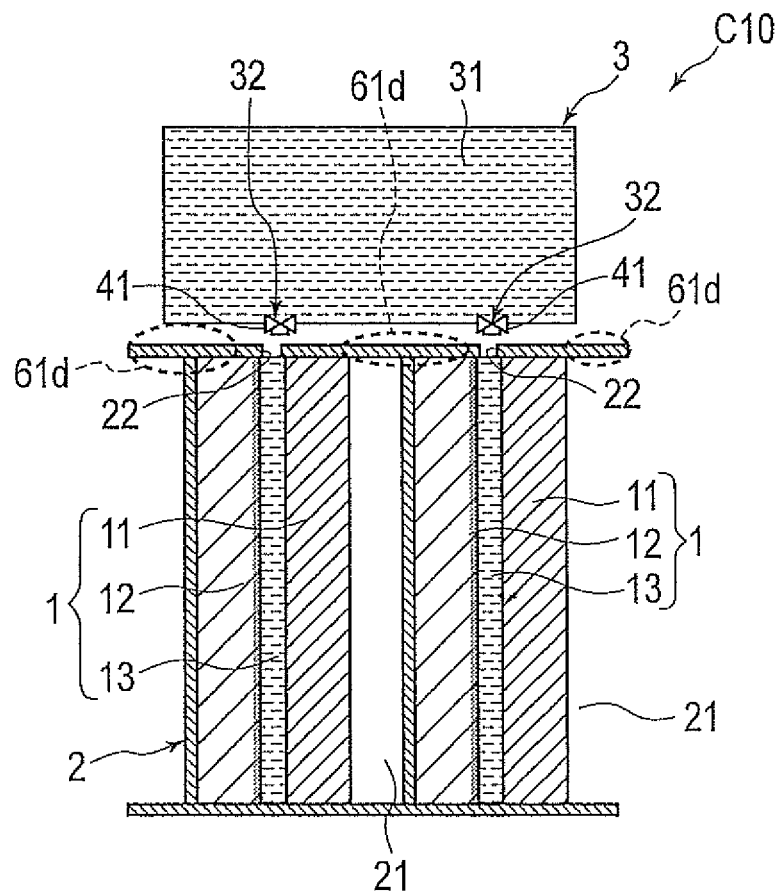
FIG. 12A is a cross-sectional view of an air cell according to a second embodiment of the present invention.
Figure 12B:
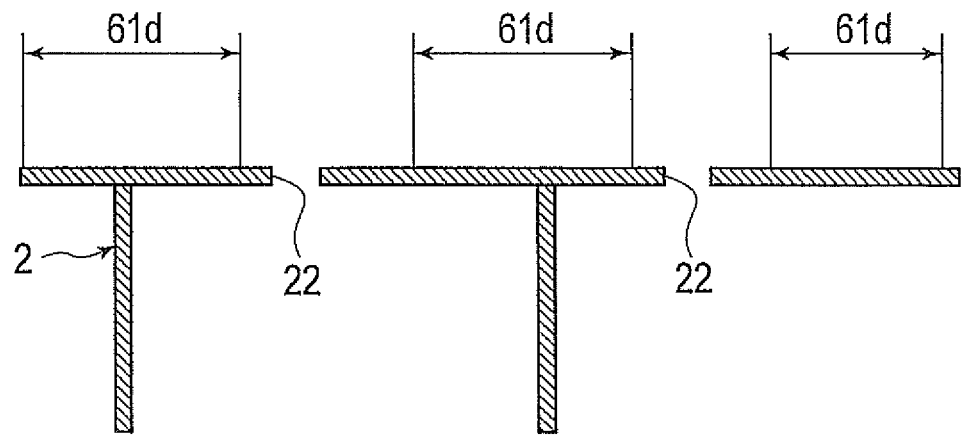
FIG. 12B is an enlarged cross-sectional view of an upper portion of an electrode housing portion according to the second embodiment of the present invention.

In the present embodiment, the same elements as those of the air cell C1 are indicated by the same reference numerals, and specific explanations thereof are omitted as appropriate. An air cell C10 shown in FIG. 12A and FIG. 12B includes the plural electrode structures 1, the electrode housing portion 2 having a plurality of housing compartments individually housing the plural electrode structures 1, and the liquid supply unit 3 for supplying the electrolyte liquid to the plural electrode structures 1, each electrode structure 1 including the air electrode 11, the metal negative electrode 12 and the filling chamber 13 for the electrolyte liquid interposed between the respective electrodes.

The electrode housing portion 2 includes, at the upper portion thereof, a plurality of water-repellent portions 61d having water repellency, instead of the plural liquid junction prevention portions 51. The respective water-repellent portions 61d are located between the liquid injection holes 22 adjacent to each other.

The water-repellent portions 61d are each formed in a manner such that an arbitrary water-repellent agent is applied to a portion between the liquid injection holes 22 adjacent to each other on the upper surface of the electrode housing portion 2. The contact angle of each water-repellent portion 61d with respect to the electrolyte liquid (namely, water or an electrolysis solution) is at least 50 degrees or greater, preferably 80 degrees or greater. The electrode housing portion 2 is further provided, at the upper portion thereof, with water-repellent portions 61d placed towards the end portions in the arrangement direction with respect to the liquid injection holes 22 for injecting the electrolyte liquid into the filling chambers 13 of the electrode structures 1 located at the end portions in the arrangement direction. In other words, the water-repellent portions 61d are also placed on both sides of each liquid injection hole 22.

The air cell C10 can remove the electrolyte liquid from the respective water-repellent portions 61d so as to prevent the electrolyte liquid remaining on the upper portion of the electrode housing portion 2 from connecting the liquid injection holes 22 adjacent to each other. Accordingly, the air cell C10 can reliably prevent a liquid junction between the electrode structures (the single cells) 1 adjacent to each other, namely, a short circuit via the electrolyte liquid. Therefore, the air cell C10 can be applied appropriately to an air cell with high output power and high capacity using an electrolysis solution having high resistance, such as a strong alkaline electrolysis solution, in which any liquid junction should be prevented. The air cell C10 is thus remarkably suitable for an onboard power supply for a vehicle or the like which is required to have high output power and high capacity.

Further, since the air cell C10 includes the liquid injection devices 32 each being located at a position vertically separate from the electrode housing portion 2, a liquid junction between the electrode structures (the single cells) 1 via the electrolyte liquid on the liquid supply unit 3 side can be prevented at the time of and after injecting the electrolyte liquid.

FIG. 13A to FIG. 15B are views for explaining air cells C11 to C13 according to the first to third modified examples of the second embodiment of the present invention. It should be noted that the same elements as those of the air cell C10 are indicated by the same reference numerals in the respective modified examples, and specific explanations thereof are omitted as appropriate.

Figure 13A:
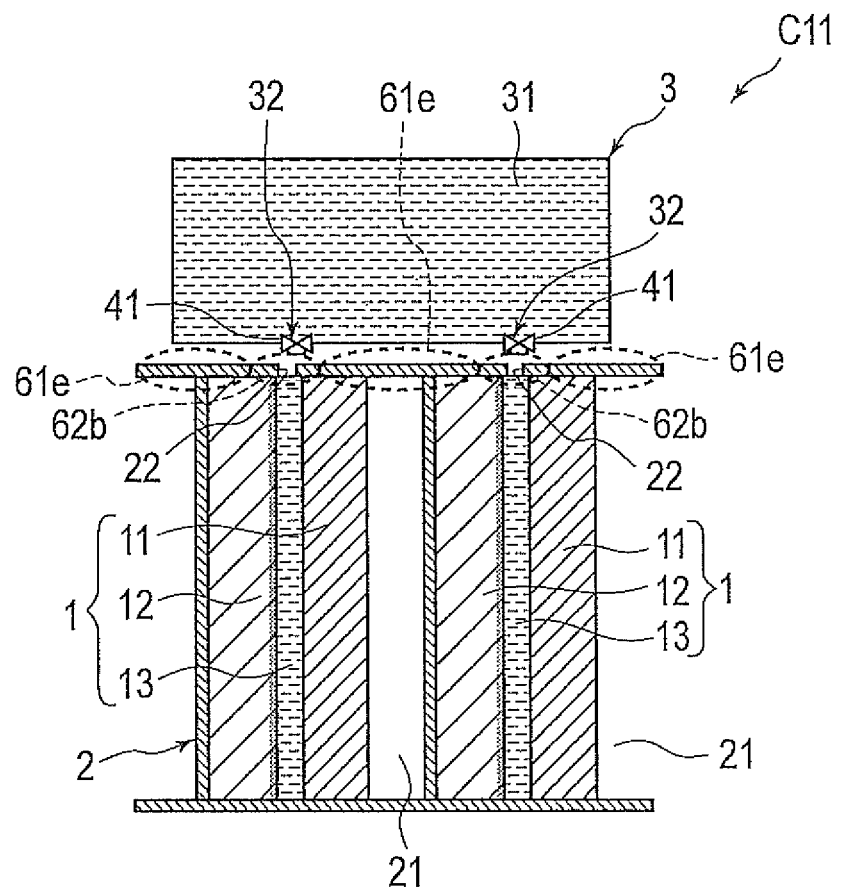
FIG. 13A is a cross-sectional view of an air cell according to a first modified example of the second embodiment of the present invention.
Figure 13B:
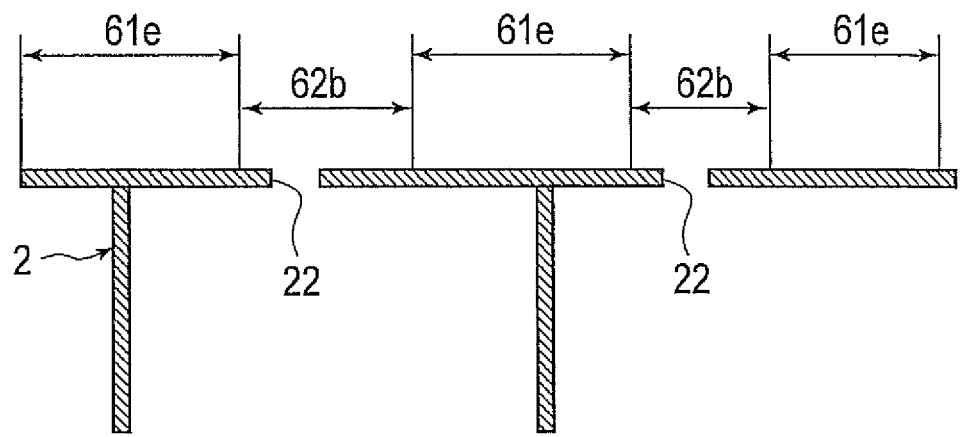
FIG. 13B is an enlarged cross-sectional view of an upper portion of an electrode housing portion according to the first modified example of the second embodiment of the present invention.

The air cell C11 according to the first modified example shown in FIG. 13A and FIG. 13B includes, on the upper surface of the electrode housing portion 2, the plural liquid injection holes 22 corresponding to the respective electrode structures 1, a plurality of water-repellent portions 61e, and a plurality of hydrophilic portions 62b provided on peripheries of the openings of the respective liquid injection holes 22. Therefore, the electrode housing portion 2 is provided, on the upper surface thereof, with the water-repellent portions 61e and the hydrophilic portions 62b including the liquid injection holes 22 alternately arranged.

The hydrophilic portions 62b are formed by the application of an arbitrary hydrophilic agent. The contact angle of each hydrophilic portion 62b with respect to the electrolyte liquid (namely, water or an electrolysis solution) is at least less than 80 degrees, preferably less than 50 degrees.

The air cell C11 configured as described above can not only achieve the same functions and effects for liquid junction prevention as the air cell C10 due to the water-repellent portions 61e but also allow the electrolyte liquid to easily flow into the respective liquid injection holes 22 due to the hydrophilic portions 62b so as to further shorten the startup time in association with an increase of the liquid injection rate.

Figure 14A:
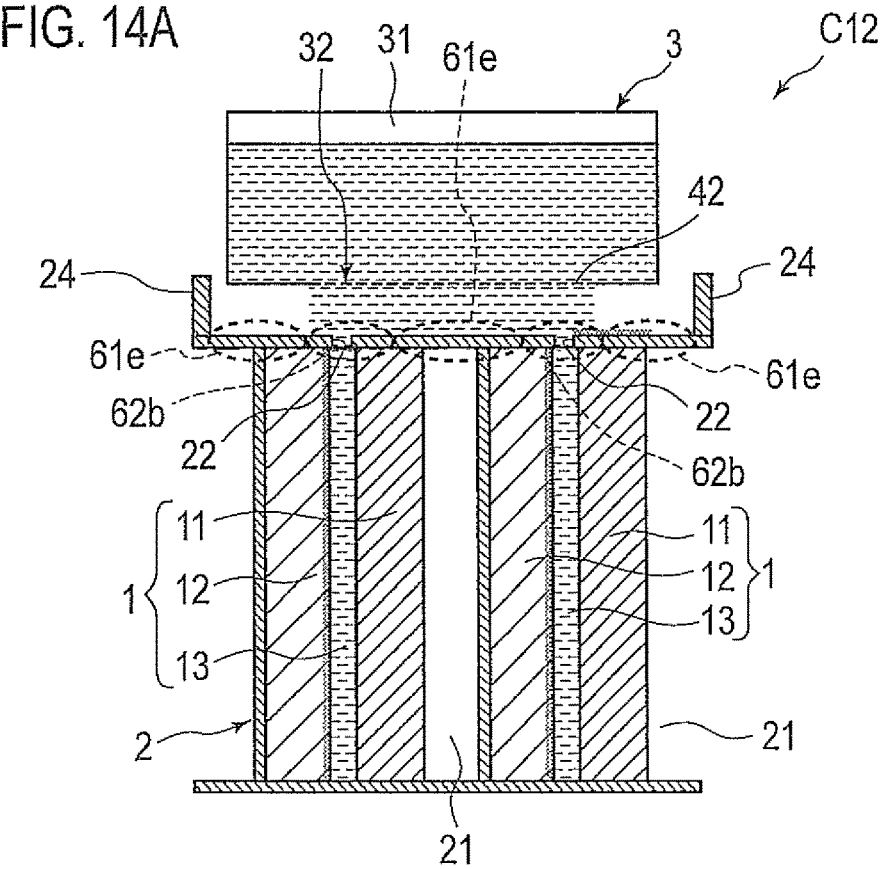
FIG. 14A is a cross-sectional view of an air cell according to a second modified example of the second embodiment of the present invention while showing a state during injection of an electrolyte liquid.
Figure 14B:
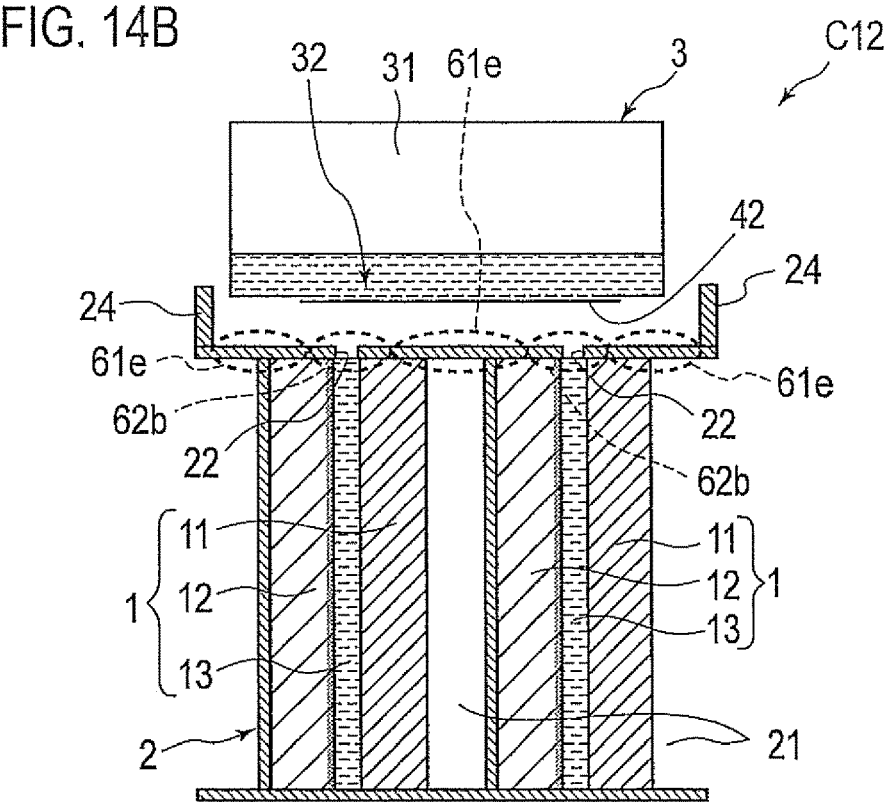
FIG. 14B is a cross-sectional view of the air cell according to the second modified example of the second embodiment of the present invention while showing a state after injection of the electrolyte liquid.

In an air cell C12 according to the second modified example shown in FIG. 14A and FIG. 14B, the liquid injection device 32 of the liquid supply unit 3 provided in the air cell C11 includes the switching body 42 instead of the switching body 41 (the switching valve) of the air cell C11. The switching body 42 is placed to allow the electrolyte liquid to flow into the plural liquid injection holes 22. The switching body 42 of this modified example is a partitioning plate. The electrode housing portion 2 is provided with ribs 24 on both sides or on the periphery of the upper surface thereof. The ribs 24 prevent the electrolyte liquid from flowing out of the air cell C12 at the time of injecting the electrolyte liquid.

The air cell C12 opens the switching body 42 so as to allow the electrolyte liquid to immediately flow onto the upper surface of the electrode housing portion 2 and thereby inject the electrolyte liquid into the plural electrode structures 1. Therefore, the air cell C12 can greatly shorten the time interval between the injection of the electrolyte liquid and the startup. The air cell C12 can remove the electrolyte liquid from the water-repellent portions 61e after the injection of the electrolyte liquid so as to prevent the electrolyte liquid from connecting the liquid injection holes 22 adjacent to each other. Accordingly, the air cell C12 can reliably prevent a liquid junction between the electrode structures (the single cells) 1 via the electrolyte liquid.

Figure 15A:
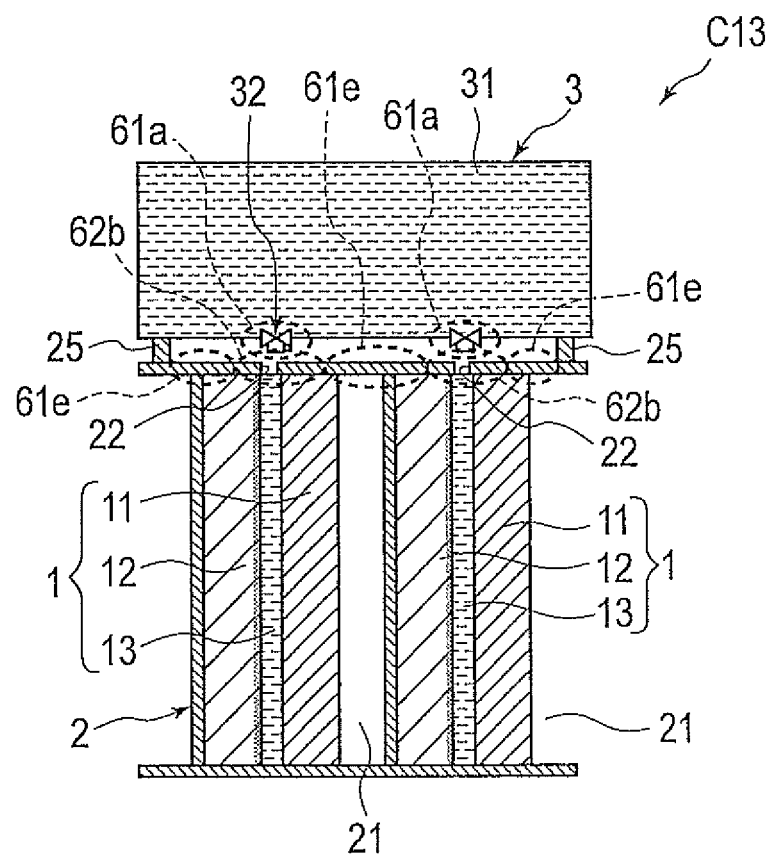
FIG. 15A is a cross-sectional view of an air cell according to a third modified example of the second embodiment of the present invention.
Figure 15B:
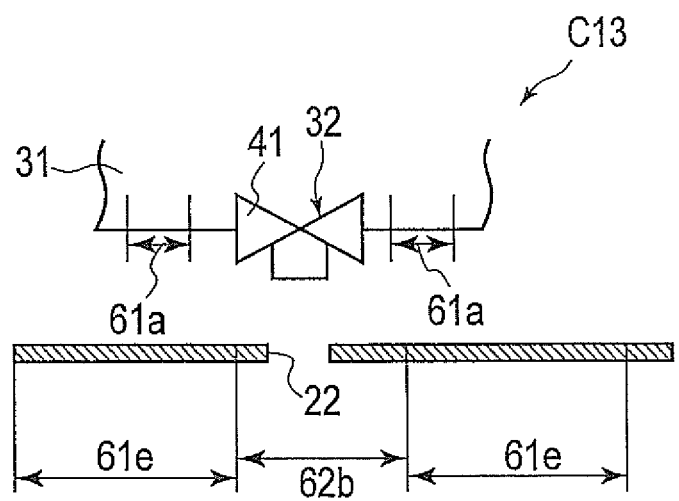
FIG. 15B is an enlarged cross-sectional view of a liquid injection device and an upper portion of an electrode housing portion according to the third modified example of the second embodiment of the present invention.

An air cell C13 according to the third modified example shown in FIG. 15A and FIG. 15B includes, on the upper surface of the electrode housing portion 2, the liquid injection holes 22, the water-repellent portions 61e and the hydrophilic portions 62b, and further includes the water-repellent portions 61a provided at least on peripheral surfaces of the respective liquid injection devices 32. The electrode housing portion 2 is provided, on the upper surface thereof, with ribs 25 in contact with the storage tank 31 of the liquid supply unit 3. The ribs 25 function to prevent the electrolyte liquid from flowing out of the air cell C13 at the time of injecting the electrolyte liquid as in the case of the air cell C12, and function to position the liquid supply unit 3 appropriately.

The air cell C13 can achieve the same functions and effects as the air cell C12 and also prevent the electrolyte liquid from adhering to the peripheries of the respective liquid injection devices 32 due to the water-repellent portions 61a on the storage tank 31 side. Accordingly, the air cell C13 having a configuration in which the storage tank 31 is in contact with the ribs 25, can prevent a liquid junction between the electrode structures (the single cells) 1 via the electrolyte liquid on the storage tank 31 side.

The air cell according to the present invention is not limited to the first or second embodiment, and specific configurations such as shapes, numbers and materials of the respective elements can be modified as appropriate without departing from the scope of the present invention. Although the first embodiment exemplified the liquid junction prevention portions having predetermined lengths such as ribs, other liquid junction prevention portions formed, for example, in such a manner as to surround the respective liquid injection holes may be applicable. Although the second embodiment exemplified the water-repellent portions having predetermined lengths, other water-repellent portions provided, for example, in regions surrounding the respective liquid injection holes may be applicable. Further, the first to eighth modified examples of the first embodiment and the first to third modified examples of the second embodiment may be combined as appropriate.

The injection-type air cell according to the present invention including a plurality of electrode structures arranged in series, can reliably prevent a liquid junction between the electrode structures via the electrolyte liquid. Thus, the air cell can be applied to an air cell with high output power and high capacity using a strong alkaline electrolysis solution, and is remarkably suitable for an onboard power supply for a vehicle or the like.

We claim:
1. An air cell comprising:
  a first electrode structure including a first filling chamber for electrolyte liquid interposed between a first air electrode and a first metal negative electrode;
  a second electrode structure including a second filling chamber for the electrolyte liquid interposed between a second air electrode and a second metal negative electrode;

an electrode housing portion individually housing the first electrode structure and the second electrode structure adjacent to one another;
a liquid supply unit that supplies the electrolyte liquid from a storage tank to the first and second electrode structures via a liquid injection device,
wherein a liquid junction prevention portion, a first liquid injection hole, and a second liquid injection hole are directly provided on an upper surface of the electrode housing portion;
wherein the first liquid injection hole is associated with the first electrode structure to inject the electrolyte liquid into the first filling chamber of the first electrode structure;
wherein the second liquid injection hole is associated with the second electrode structure to inject the electrolyte liquid into the second filling chamber of the second electrode structure;
wherein the liquid junction prevention portion divides a first space between the first liquid injection hole and the liquid injection device and a second space between the second liquid injection hole and the liquid injection device,
wherein the liquid injection device is separated from each of the first liquid injection hole and the second liquid injection hole by an empty space, and there is no structure interposed between the liquid injection device and the first liquid injection hole and between the liquid injection device and the second liquid injection hole,
wherein the electrode housing portion is connected to the first filling chamber via the first liquid injection hole, and the electrode housing portion is connected to the second filling chamber via the second liquid injection hole, and
wherein the liquid junction prevention portion protrudes upward from the upper surface of the electrode housing portion.

2. The air cell according to claim 1, wherein two additional liquid junction prevention portions are located towards arrangement end portions of the electrode housing portion to direct the electrolyte liquid into third and fourth filling chambers of third and fourth electrode structures, respectively, the third and fourth electrode structures located at the arrangement end portions.

3. The air cell according to claim 1, wherein the liquid junction prevention portion has a protruding structure.

4. The air cell according to claim 3, wherein the liquid junction prevention portion has a surface inclined downward toward the first liquid injection hole adjacent thereto.

5. The air cell according to claim 4, wherein the liquid junction prevention portion has a triangular cross-section.

6. The air cell according to claim 4, wherein the liquid junction prevention portion has a trapezoidal cross-section.

7. The air cell according to claim 3, wherein the liquid junction prevention portion has a downward step towards the first liquid injection hole adjacent thereto.

8. The air cell according to claim 3, wherein the liquid junction prevention portion has a concave curved surface inclined downward toward the first liquid injection hole adjacent thereto.

9. The air cell according to claim 3, wherein the liquid junction prevention portion has a convex curved surface inclined downward toward the first liquid injection hole adjacent thereto.

10. The air cell according to claim 3, wherein the liquid junction prevention portion includes plural projections arranged at predetermined intervals in an arrangement direction of the first and second electrode structures.

11. The air cell according to claim 10, wherein the plural projections have a common height.

12. The air cell according to claim 10, wherein the plural projections have different heights.

13. The air cell according to claim 1, wherein the liquid injection device includes a switching body which controls a flow of the electrolyte liquid.

14. The air cell according to claim 1, wherein the liquid injection device is placed to allow the electrolyte liquid to concurrently flow into the first and second liquid injection holes.

15. The air cell according to claim 1, wherein at least a peripheral surface of the liquid injection device has water repellency.

16. The air cell according to claim 3, wherein a top surface of the liquid junction prevention portion has water repellency.

17. The air cell according to claim 1, wherein a periphery of an opening of the first liquid injection hole is a hydrophilic region having hydrophilicity.

18. The air cell according to claim 17, wherein an outer side of the periphery of the opening of the first liquid injection hole has a water-repellent region having water repellency.

19. An air cell comprising:
a first electrode structure including a first filling chamber for electrolyte liquid interposed between a first air electrode and a first metal negative electrode;
a second electrode structure including a second filling chamber for the electrolyte liquid interposed between a second air electrode and a second metal negative electrode;
an electrode housing portion individually housing the first and second electrode structures adjacent to one another;
a liquid supply unit that supplies the electrolyte liquid from a storage tank to the first and second electrode structures via a liquid injection device,
wherein a liquid junction prevention portion, a first liquid injection hole, and a second liquid injection hole are directly provided on an upper surface of the electrode housing portion;
wherein the first liquid injection hole is associated with the first electrode structure to inject the electrolyte liquid into the first filling chamber of the first electrode structure;
wherein the second liquid injection hole is associated with the second electrode structure to inject the electrolyte into the second filling chamber of the second electrode structure;
wherein the liquid injection device is separated from the first liquid injection hole and the second liquid injection hole and there is no structure intervening between the liquid injection device and the first liquid injection hole and between the liquid injection device and the second liquid injection hole,
wherein the electrode housing portion is connected to the first filling chamber via the first liquid injection hole, and the electrode housing portion is connected to the second filling chamber via the second liquid injection hole, and
wherein the liquid junction prevention portion protrudes upward from the upper surface of the electrode housing portion.

* * * * *